J. F. BARBEE.
HARROW ATTACHMENT FOR CULTIVATORS.
APPLICATION FILED APR. 25, 1908.
910,349.
Patented Jan. 19, 1909.
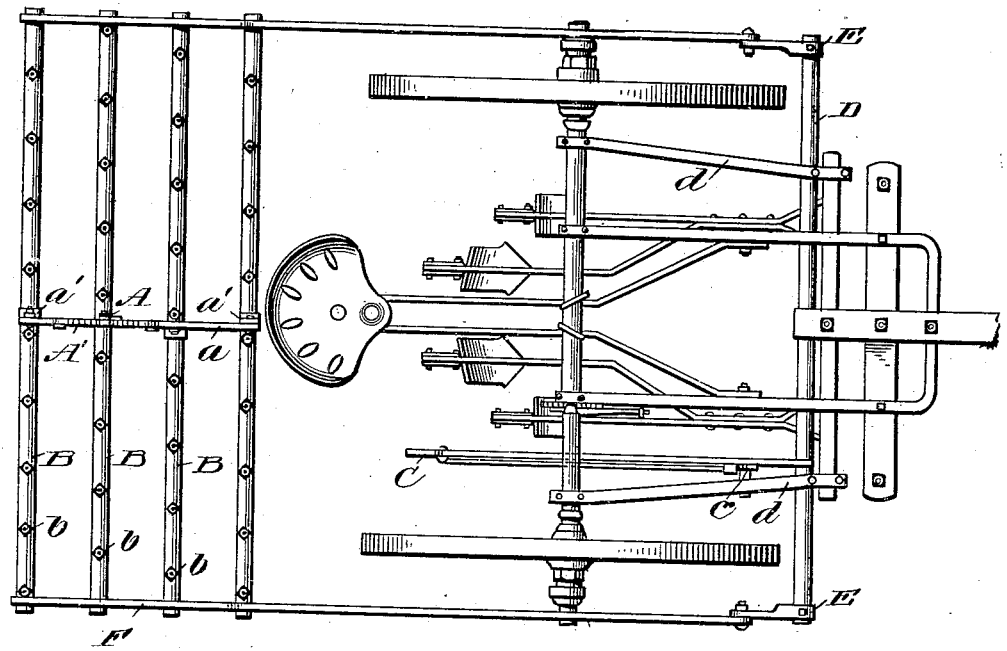
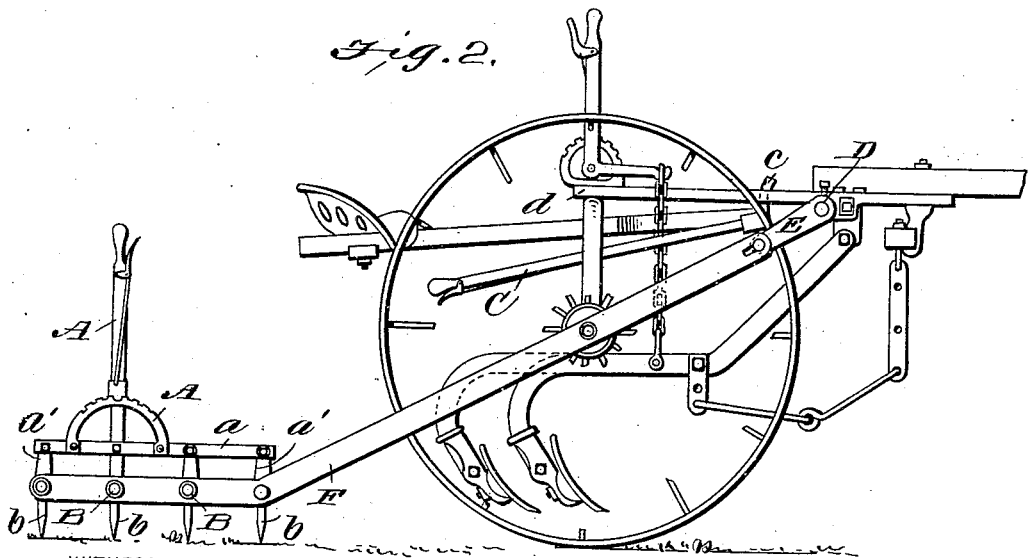
WITNESSES
F. C. Barry
E. M. Callaghan
INVENTOR
JOHN F. BARBEE
BY Munn & Co.
ATTORNEYS

UNITED STATES PATENT OFFICE.

JOHN F. BARBEE, OF GRAND ISLAND, NEBRASKA.

HARROW ATTACHMENT FOR CULTIVATORS.

No. 910,349.  Specification of Letters Patent.  Patented Jan. 19, 1909.

Application filed April 25, 1908. Serial No. 429,192.

*To all whom it may concern:*

Be it known that I, JOHN F. BARBEE, a citizen of the United States, residing at Grand Island, in the county of Hall and State of Nebraska, have invented a new and useful Improvement in Harrow Attachments for Cultivators, of which the following is a specification.

This invention is a harrow attachment for wheeled cultivators, designed to follow the cultivator and complete the work thereof, by smoothing and pulverizing the soil and uprooting weeds dislodged by the cultivator shovels. The harrow will act to destroy weeds not reached by the cultivator and break up lumps of dirt, and will leave the ground generally in better shape.

The device is capable of being applied to any ordinary cultivator and forms a simple and inexpensive attachment of great strength and durability, which can be readily applied to or removed from the cultivator and is suitable for use in working a variety of crops such as corn in rows or hills, oats and other small grain, and can be used in planting as well as in cultivating, as it will assist in covering the seed and pulverizing the soil.

The invention is illustrated in the accompanying drawings, in which—

Figure 1 is a plan of the attachment applied to a cultivator of known construction. Fig. 2 is a side elevation thereof.

The harrow has a series of parallel transverse bars B conveniently made of pipe the ends of which are set to turn in parallel side bars F. The teeth b are fastened to the bars B and their slant may be varied by the lever A connected to a bar a pivoted to the upper ends of arms a' on the tooth bars B. The lever A has a latch engaging a notched segment A' on the bar a.

The side bars F are extended forwardly at an inclination upwardly and are fulcrumed upon the opposite ends of the main axle G of the cultivator, forming levers by means of which the harrow may be raised from the ground. At the front end the levers are connected to arms E forming cranks at the ends of a rock shaft D supported in suitable bearings or hangers on the frames d of the cultivator; and the shaft D may be turned by means of a hand lever C fixed thereto and extending rearwardly to convenient position near the seat of the cultivator. This lever has a latch engageable with a notched segment c fastened to the cultivator frame. When the rock shaft D is turned by the lever C the side levers F are swung up or down accordingly and so the harrow is raised from or lowered to the ground, and its position adjusted as desired. The bars F, fulcrumed on the axle G, afford a rigid support, without complex or expensive parts.

The particular construction of the cultivator is not material to the invention, since the attachment can be applied with or without modification to any of the standard cultivators. For instance, it may be applied to an ordinary wheeled straddle-row cultivator. Also the harrow may be any form desired, although the form shown is well adapted for the purpose. With a very light or small harrow one of the lever bars F may be omitted, or said arms may be fulcrumed on the axle inside the wheels, instead of outside as shown. Various other changes may be made within the scope of the following claim.

The drawings show a harrow with straight tooth bars, but for use with a straddle row cultivator, in plowing rather large corn. the tooth bars of the harrow may be arched, and the teeth at the middle omitted, so as to pass over the corn without injury thereto.

I claim—

The combination with a cultivator having an axle and wheels, of a harrow attachment comprising a harrow behind the cultivator and having rigid lever bars extending forwardly at each side and fulcrumed on the axle, a rock shaft journaled on the cultivator frame and having at each end lateral arms pivotally connected with the rigid lever bars, means for oscillating the rock shaft, and means for locking it in its adjusted position.

JOHN F. BARBEE.

Witnesses:
 JENNIE LOMBO,
 W. W. HARPER.